(12) United States Patent  
Li et al.

(10) Patent No.: US 11,968,294 B2  
(45) Date of Patent: Apr. 23, 2024

(54) DATA MANAGEMENT METHOD AND APPARATUS FOR BLOCKCHAIN SYSTEM, MEDIUM, AND ELECTRONIC DEVICE

(71) Applicant: Tencent Technology (Shenzhen) Company Limited, Shenzhen (CN)

(72) Inventors: Maocai Li, Shenzhen (CN); Zongyou Wang, Shenzhen (CN); Li Kong, Shenzhen (CN); Kaiban Zhou, Shenzhen (CN); Hu Lan, Shenzhen (CN); Yifang Shi, Shenzhen (CN); Changqing Yang, Shenzhen (CN); Jinsong Zhang, Shenzhen (CN); Yong Ding, Shenzhen (CN); Gengliang Zhu, Shenzhen (CN); Qucheng Liu, Shenzhen (CN); Qiuping Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 627 days.

(21) Appl. No.: 17/148,258

(22) Filed: Jan. 13, 2021

(65) Prior Publication Data

US 2021/0135848 A1 May 6, 2021

Related U.S. Application Data

(63) Continuation of application No. PCT/CN2019/120955, filed on Nov. 26, 2019.

(30) Foreign Application Priority Data

Dec. 7, 2018 (CN) .......................... 201811497453.4

(51) Int. Cl.
*H04L 9/08* (2006.01)
*H04L 9/00* (2022.01)

(52) U.S. Cl.
CPC ............ *H04L 9/083* (2013.01); *H04L 9/0825* (2013.01); *H04L 9/50* (2022.05)

(58) Field of Classification Search
CPC .......................... H04L 9/08–0836; H04L 9/50
See application file for complete search history.

(56) References Cited

U.S. PATENT DOCUMENTS

| 6,167,513 | A | 12/2000 | Inoue et al. | |
| 8,503,681 | B1 * | 8/2013 | McGrew | ............... H04L 63/065 713/171 |

(Continued)

FOREIGN PATENT DOCUMENTS

| CN | 107292621 A | 10/2017 |
| CN | 107733651 A | 2/2018 |

(Continued)

OTHER PUBLICATIONS

Tencent Technology, ISR, PCT/CN2019/120955, Feb. 28, 2020, 2 pgs.

(Continued)

*Primary Examiner* — Madhuri R Herzog
(74) *Attorney, Agent, or Firm* — Morgan, Lewis & Bockius LLP

(57) ABSTRACT

This application provide a data management method for a blockchain system, a medium, and an electronic device. The system includes an accounting node sub-network and a service node sub-network. The method includes: adding, after an accounting node generates a first data block, first key information used for verifying a block header of a second data block generated after the first data block to a block header of the first data block; generating a signature corresponding to the first data block, and adding the signature corresponding to the first data block to the block header of the first data block; and releasing the block header of the first data block to the service node sub-network, to cause a (Continued)

service node to verify the signature included in the block header of the first data block, and obtaining the first key information after a successful verification to verify the block header of the second data block.

15 Claims, 7 Drawing Sheets

(56) References Cited

U.S. PATENT DOCUMENTS

| | | | |
|---|---|---|---|
| 10,587,419 B2 * | 3/2020 | Pattanaik | H04L 9/3239 |
| 2018/0253464 A1 | 9/2018 | Kohli et al. | |
| 2018/0285767 A1 | 10/2018 | Chew | |
| 2018/0293553 A1 | 10/2018 | Dembo et al. | |
| 2019/0140822 A1 * | 5/2019 | Xie | G06Q 20/382 |
| 2019/0342078 A1 * | 11/2019 | Li | G06F 21/64 |
| 2020/0344073 A1 * | 10/2020 | Dix | H04L 41/0803 |

FOREIGN PATENT DOCUMENTS

| | | |
|---|---|---|
| CN | 107733966 A | 2/2018 |
| CN | 107819582 A | 3/2018 |
| CN | 108235799 A | 6/2018 |
| CN | 108765240 A | 11/2018 |
| CN | 109379381 A | 2/2019 |
| JP | H 10135945 A | 5/1998 |
| JP | 2003022007 A * | 1/2003 |
| JP | 2003022007 A | 1/2003 |
| JP | 2005217679 A | 8/2005 |
| WO | WO 2017079652 A1 | 5/2017 |
| WO | WO 2017204943 A1 | 11/2017 |

OTHER PUBLICATIONS

Tencent Technology, WO, PCT/CN2019/120955, Feb. 28, 2020, 4 pgs.
Tencent Technology, IPRP, PCT/CN2019/120955, Jun. 8, 2021, 5 pgs.
Extended European Search Report, EP19893257.6, dated Dec. 1, 2021, 8 pgs.
Kc Tam, "Notarization in Blockchain (Part 1)", Aug. 28, 2018, pp. 1-4, XP055638784, Retrieved from the Internet: https://kctheservant.medium.com/notarizati tion-in-blockchain-part-1-a9795f19e28d.

* cited by examiner

DATA MANAGEMENT METHOD AND APPARATUS FOR BLOCKCHAIN SYSTEM, MEDIUM, AND ELECTRONIC DEVICE

CROSS REFERENCE TO RELATED APPLICATIONS

This application is a continuation application of PCT Patent Application No. PCT/CN2019/120955, entitled "DATA MANAGEMENT METHOD FOR BLOCK CHAIN SYSTEM, DEVICE, MEDIUM, AND ELECTRONIC APPARATUS" filed on Nov. 26, 2019, which claims priority to Chinese Patent Application No. 201811497453.4, filed with the State Intellectual Property Office of the People's Republic of China on Dec. 7, 2018, and entitled "DATA MANAGEMENT METHOD AND APPARATUS FOR BLOCKCHAIN SYSTEM, MEDIUM, AND ELECTRONIC DEVICE", all of which are incorporated herein by reference in their entirety.

FIELD OF THE TECHNOLOGY

This application relates to the field of computer and communication technologies, and specifically, to a data management method and apparatus for a blockchain system, a medium, and an electronic device.

BACKGROUND OF THE DISCLOSURE

A blockchain network is an end-to-end decentralized network composed of a large quantity of nodes together, and each of the nodes is permitted to obtain a complete database copy, that is, information is completely shared among the nodes. The nodes maintain an entire blockchain together based on a consensus mechanism. The so-called consensus mechanism is to verify and confirm a transaction in a very short time through voting of special nodes. If a plurality of nodes with unrelated interests can reach a consensus on a transaction, it may be considered that the entire network can also reach a consensus on this transaction.

In an application scenario of a blockchain system, data in the blockchain network may need to be transmitted to a service node outside the blockchain network. In this application scenario, the data transmitted to the service node needs to be signed to help the service node verify the data. However, how to avoid a case that data insecurity is caused due to leakage of a signature key is a technical problem to be resolved urgently.

SUMMARY

Embodiments of this application provide a data management method and apparatus for a blockchain system, a medium, and an electronic device, further to flexibly update a block header verification key at least to some extent, as to as ensure security of block header data.

Other features and advantages of this application become obvious through the following detailed descriptions, or may be learned partially by the practice of this application.

According to the embodiments of this application, a data management method for a blockchain system is provided. The blockchain system includes an accounting node sub-network and a service node sub-network, the accounting node sub-network includes an accounting node, and the service node sub-network includes a service node. The data management method includes: adding, after the accounting node in the accounting node sub-network generates a first data block, first key information used for verifying a block header of a second data block generated after the first data block to a block header of the first data block; generating a signature corresponding to the first data block, and adding the signature corresponding to the first data block to the block header of the first data block; and releasing the block header of the first data block to the service node sub-network, to cause the service node in the service node sub-network to verify the signature included in the block header of the first data block, and obtaining the first key information after a successful verification to verify the block header of the second data block.

According to the embodiments of this application, a data management method for a blockchain system is provided. The blockchain system includes an accounting node sub-network and a service node sub-network, the accounting node sub-network includes an accounting node, the service node sub-network includes a service node, and the data management method is performed by the service node in the service node sub-network. The data management method includes: receiving a block header of a first data block from the accounting node sub-network, the block header of the first data block including a signature and first key information used for verifying a block header of a second data block generated after the first data block; verifying the signature included in the block header of the first data block; and obtaining the first key information after successfully verifying the signature included in the block header of the first data block, to verify the received block header of the second data block through the first key information.

According to the embodiments of this application, a data management apparatus for a blockchain system is provided. The blockchain system includes an accounting node sub-network and a service node sub-network, the accounting node sub-network includes an accounting node, and the service node sub-network includes a service node. The data management apparatus includes: an addition unit, configured to add, after the accounting node in the accounting node sub-network generates a first data block, first key information used for verifying a block header of a second data block generated after the first data block to a block header of the first data block; a generation unit, configured to generate a signature corresponding to the first data block, and add the signature corresponding to the first data block to the block header of the first data block; and a transmission unit, configured to release the block header of the first data block to the service node sub-network, to cause the service node in the service node sub-network to verify the signature included in the block header of the first data block, and obtain the first key information after a successful verification to verify the block header of the second data block.

According to the embodiments of this application, a data management apparatus for a blockchain system is provided. The blockchain system includes an accounting node sub-network and a service node sub-network, the accounting node sub-network includes an accounting node, the service node sub-network includes a service node, and the service node includes the data management apparatus. The data management apparatus includes: a receiving unit, configured to receive a block header of a first data block from the accounting node sub-network, the block header of the first data block including a signature and first key information used for verifying a block header of a second data block generated after the first data block; a verification unit, configured to verify the signature included in the block header of the first data block; and an obtaining unit, configured to obtain the first key information after successfully verifying the signature included in the block header of the first data block, to verify the received block header of the second data block through the first key information.

According to the embodiments of this application, a non-transitory computer-readable medium is provided, storing a plurality of computer programs that, when executed by a processor, cause the processor to perform the data management method for a blockchain system according to the foregoing embodiments.

According to the embodiments of this application, an electronic device is provided, including: one or more processors and a storage apparatus; the storage apparatus being configured to store one or more programs, the one or more programs, when executed by the one or more processors, causing the one or more processors to implement the data management method for a blockchain system according to the foregoing embodiments.

In the technical solutions provided in some embodiments of this application, by adding first key information used for verifying a block header of a second data block generated after a first data block to a block header of the first data block, and adding a signature corresponding to the first data block to the block header of the first data block and then releasing the block header of the first data block to a service node sub-network, a service node in the service node sub-network may obtain, after verifying the signature included in the block header of the first data block, the first key information used for verifying the block header of the second data block from the block header of the first data block, that is, may indicate key information adopted for verifying a block header of a next data block through a block header of a current data block, thereby flexibly updating a block header verification key, avoiding the inconvenience caused by inflexible key replacement, and also avoiding the possibility of data insecurity due to the use of fixed keys. In addition, according to the technical solutions of the embodiments of this application, key information adopted for verifying a block header of a next data block may be obtained only after a block header of a current data block is verified successfully, so that the security of the block header data can be effectively ensured.

It is to be understood that the above general descriptions and the following detailed descriptions are merely for exemplary and explanatory purposes, and cannot limit this application.

BRIEF DESCRIPTION OF THE DRAWINGS

Accompanying drawings herein are incorporated into a specification and constitute a part of this specification, show embodiments that conform to this application, and are used to describe a principle of this application together with this specification. Apparently, the accompanying drawings described below are merely some embodiments of this application, and a person of ordinary skill in the art may further obtain other accompanying drawings according to the accompanying drawings without creative efforts. In the drawings.

DESCRIPTION OF EMBODIMENTS

At present, the examples of implementations are described comprehensively with reference to the accompanying drawings. However, the examples of implementations may be implemented in a plurality of forms, and it is not to be understood as being limited to the examples described herein. Conversely, the implementations are provided to make this application more comprehensive and complete, and comprehensively convey the idea of the examples of the implementations to a person skilled in the art.

In addition, the described features, structures, or characteristics may be combined in one or more embodiments in any appropriate manner. In the following descriptions, a lot of specific details are provided to give a comprehensive understanding of the embodiments of this application. However, a person of ordinary skill in the art is to be aware that, the technical solutions in this application may be implemented without one or more of the particular details, or another method, component, apparatus, or step may be used. In other cases, well-known methods, apparatuses, implementations, or operations are not shown or described in detail, in order not to obscure the aspects of this application.

The block diagrams shown in the accompany drawings are merely functional entities and do not necessarily correspond to physically independent entities. That is, such functional entities may be implemented in the form of software, or implemented in one or more hardware modules or integrated circuits, or implemented in different networks and/or processor apparatuses and/or microcontroller apparatuses.

The flowcharts shown in the accompanying drawings are merely exemplary descriptions and do not necessarily include all of the content and operations/steps, nor are the flowcharts necessarily performed in the order described. For example, some operations/steps may be further divided, and some operations/steps may be combined or partially combined. Therefore, an actual execution order may be changed according to the actual situation.

Figure 1:
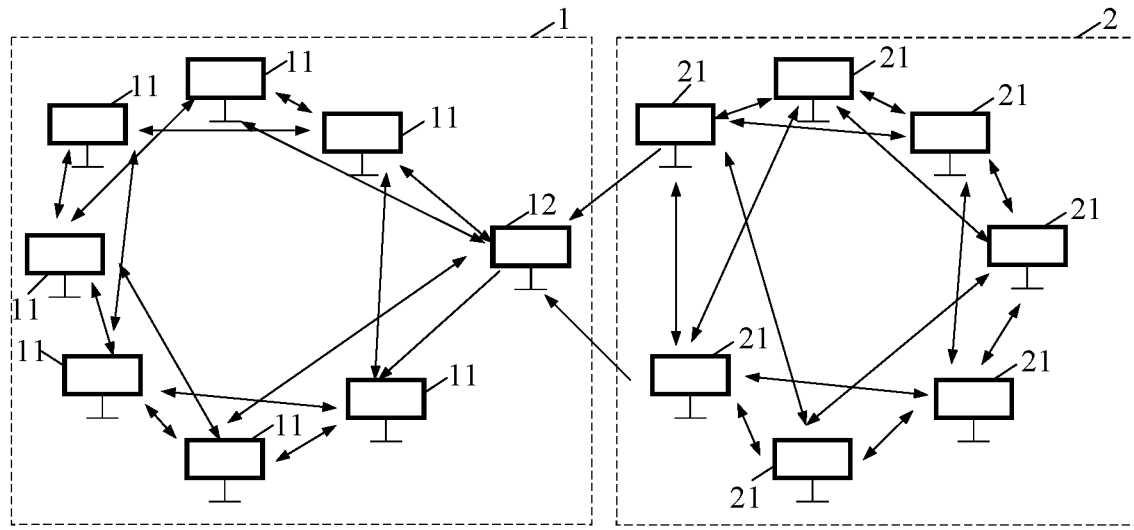
FIG. 1 to FIG. 3 are schematic diagrams of a system architecture of a blockchain system to which the embodiments of this application are applied.

FIG. 1 shows a system architecture of a blockchain system to which the embodiments of this application are applied. The blockchain system includes an accounting node sub-network 2 and a service node sub-network 1. The accounting node sub-network 2 includes accounting nodes 21 for reaching a consensus on a data block and recording the data block on a blockchain. The service node sub-network 1 includes service nodes 11, and the service node 11 may verify the data block recorded by the accounting node on the blockchain, or may request corresponding transaction data from the accounting node.

Specifically, that the service node 11 verifies the data block recorded by the accounting node on the blockchain may include the following steps: generating, by an accounting node 21 in the accounting node sub-network, a signature based on transaction information to be included in a data block to be added to the blockchain by using a key specific to the accounting node; adding, by the accounting node 21, the transaction information and the generated signature to the data block and adding the data block to the blockchain; and transmitting, by the accounting node 21, the signature to the service node in the service node sub-network, and performing, by the service node, a signature verification on the signature according to the key specific to the accounting node, to implement a verification of the service node 11 on the data block recorded by the accounting node on the blockchain. The accounting node in the accounting node sub-network is responsible for recording a data block on the blockchain, and the service node in the service node sub-network is responsible for witnessing a result recorded by the accounting node. Specifically, the accounting node generates a signature based on transaction information to be included in a data block to be added to the blockchain, and then adds the transaction information and the generated signature to the data block to be chained. The signature is transmitted to the service node in the service node sub-network, to cause the service node to perform a signature verification on the signature according to a key specific to the accounting node. The service node in the service node sub-network may witness transaction data of the entire network by verifying an accounting node signature on the block. Although an accounting network has a monopolistic accounting permission, all behaviors are public and traceable because the data block has a digital signature that represents an identity of an accounter. If the accounting nodes misbehave together, all nodes witnessing the transaction data of the entire network preserve specific evidence that the accounting nodes misbehave. Compared with a conventional centralized system and a private chain, in this solution, the system operates more transparently; and compared with a conventional solution of a decentralized public chain, this solution is more controllable and more convenient in supervision.

In an embodiment of this application, the accounting node sub-network 2 and the service node sub-network 1 may be connected through an agent node 12. The agent node 12 may be a service node of the service node sub-network 1, and is responsible for transmitting information to be transmitted by the accounting node 21 to the service node 11 to the service node 11. The service node 11 is a terminal of a transaction party generating various types of transaction data to be chained, or may be a terminal querying transaction data from the accounting node sub-network 2. The transaction data generated by the service node 11 is transmitted to the accounting node 21 through the agent node 12, and then is recorded on the blockchain after a consensus is reached, which is beneficial to unified processing and supervision of the transaction data. The service node 11 may alternatively supervise and witness the chaining of the transaction data through the information transmitted by the accounting node 21 through the agent node 12. This is of great significance in some scenarios in which unified supervision is required because of worrying about collective cheating of supervised nodes.

In the structure shown in FIG. 1, the service node sub-network 1 adopts a P2P network mode. The P2P network is a distributed application architecture that allocates tasks and workloads between peers, and a networking or network form formed by a peer-to-peer computing model at an application layer, that is, a "point-to-point" or "end-to-end" network. It may be defined: participants in the network share some hardware resources (processing capability, storage capability, network connection capability, printers, and the like) they own. These shared resources provide services and content through the network, and can be accessed directly by other peer nodes through no intermediate entity. The participants in this network are not only providers of the resources, services, and content, but also obtainers of the resources, services, and content. Therefore, in the service node sub-network 1, after receiving a message transmitted from the accounting node 21, the agent node 12 propagates the message to a surrounding service node 11; and after receiving the message, the surrounding service node 11 transmits the message to a service node 11 near the foregoing surrounding service node, thereby propagating the message among all service nodes 11 of the service node sub-network 1.

Figure 2:
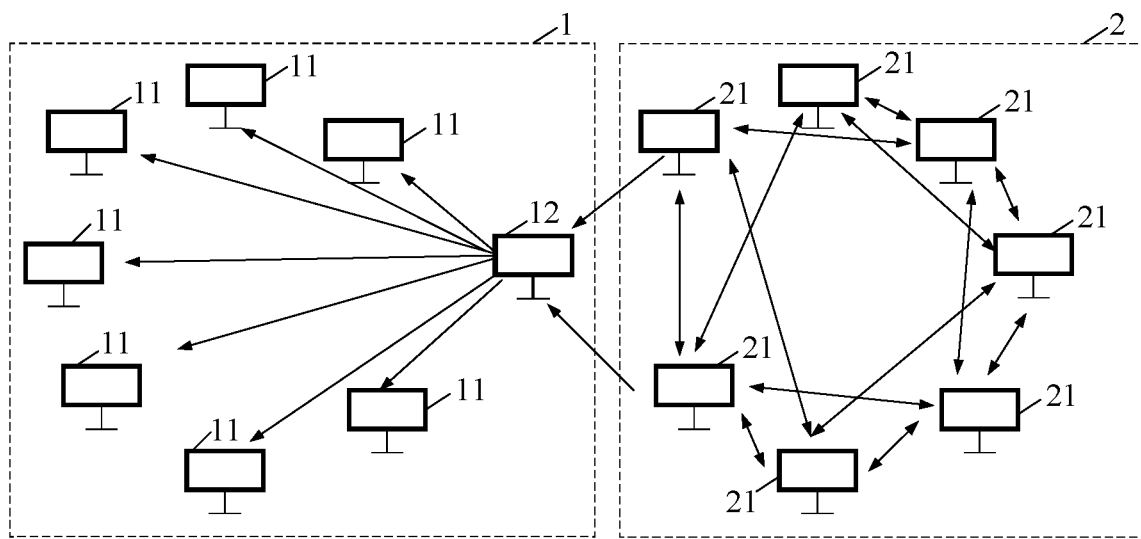

FIG. 2 shows a system architecture of another blockchain system to which the embodiments of this application are applied. A difference between the system architecture and the system architecture shown in FIG. 1 is: a broadcast network mode is adopted in the service node sub-network 1 instead of the P2P network mode. Specifically, after receiving a message transmitted from the accounting node 21, the agent node 12 broadcasts the message to other service nodes 11 in the service node sub-network 1. In this case, the message is propagated among all service nodes 11 in the service node sub-network 1.

Figure 3:
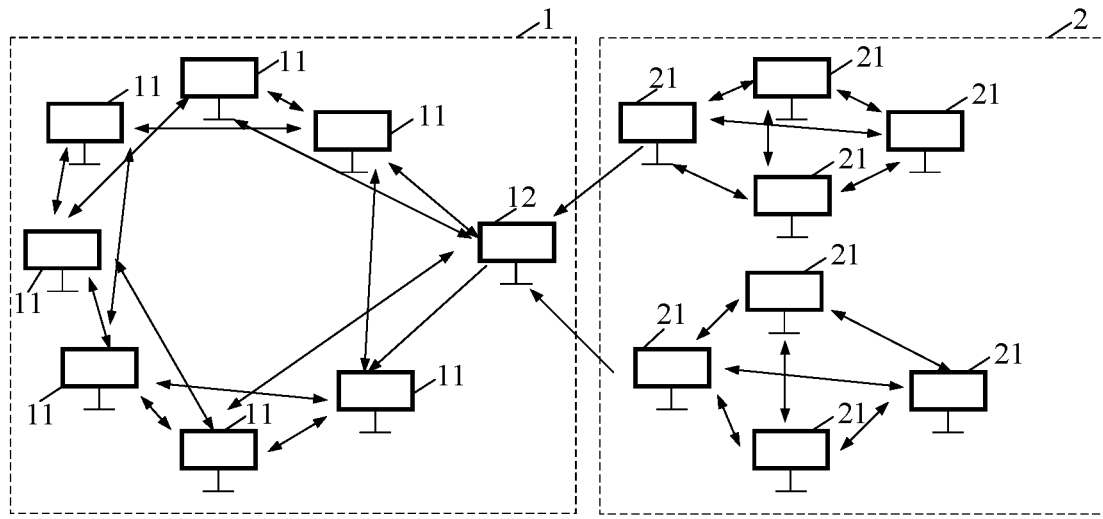

FIG. 3 shows a system architecture of another blockchain system to which the embodiments of this application are applied. A difference between the system architecture and the system architecture shown in FIG. 1 is: the accounting node sub-network 2 of the system architecture is divided into a plurality of branch accounting node sub-networks. Each branch accounting node sub-network may be responsible for recording one type of transaction information. For example, one enterprise may have a supply-chain finance service, and may need to record contract information, payment for goods on credit, and other information generated during supply and marketing on the blockchain. Meanwhile, the enterprise also needs to issue an invoice, and records billing information, invoice reimbursement information, and other information on the blockchain. In this case, to satisfy a requirement that accounting nodes are supervised by the same department, an accounting node recording a supply-chain finance service transaction and an accounting node recording a transaction during invoice flow may need to belong to different departments. For example, the accounting node recording a supply-chain finance service transaction is an accounting terminal set by a bank, while the accounting node recording a transaction during invoice flow is an accounting terminal set by the State Taxation Administration. Therefore, the supply-chain finance service transaction and the transaction recorded during invoice flow may alternatively be recorded on different branch accounting node sub-networks finally. In this case, the agent node 12 needs to transmit, according to a transaction type carried in transaction information transmitted by the service node 11, the transaction information to a branch accounting node sub-network corresponding to the transaction type.

In the system architectures of the blockchain system shown in FIG. 1 to FIG. 3, the agent node 12 is located in the service node sub-network 1. In other embodiments of this application, the agent node 12 may alternatively be located in a consensus node sub-network 2, or be independent of the service node sub-network 1 and the consensus node sub-network 2.

The system architectures of the blockchain system shown in FIG. 1 to FIG. 3 may be applied to an application scenario of an electronic invoice, which is described in detail below.

In an embodiment of this application, accounting nodes in an accounting node sub-network may be State Taxation Administration terminals, for example, State Taxation Administration terminals deployed in a plurality of regions are used as accounting nodes respectively to construct an accounting node sub-network. Each service node in a service node sub-network may be a local taxation bureau terminal, a billing agent service provider terminal, a billing enterprise terminal, an individual user terminal, or the like.

After an accounting node in an accounting node sub-network generates a data block (the data block may include information about an issued invoice and the like), a block header of the generated data block may be released to a service node sub-network, to notify the service node sub-network of information about the newly-generated data block. Meanwhile, a problem that data in the data block is illegally stolen by a role (for example, an individual user cannot view invoice information unrelated to the user and the like) with no access permission due to directly transmitting the data block to the service node sub-network is avoided. Meanwhile, before the accounting node releases the block header to the service node sub-network, the block header needs to be signed, and key information adopted for verifying a next block header may be added.

After receiving the block header of the data block, the service node in the service node sub-network verifies the data block, and may learn, after the verification is successful, a data block newly generated in the accounting node sub-network; and meanwhile, may obtain the key information adopted for verifying the next block header, to verify the received next block header. Afterward, the service node may request to obtain, from the accounting node sub-network, transaction data (for example, transmit an obtaining request of the transaction data to the accounting node sub-network through the agent node) included in a designated data block. After receiving the obtaining request of the transaction data included in the designated data block, the accounting node in the accounting node sub-network may obtain permission information of a service node transmitting the obtaining request, and then return, according to the permission information, transaction data that the service node is permitted to obtain and that is included in the designated data block to the service node. For example, a provincial taxation bureau can access invoice information related to the province, a municipal taxation bureau can only access invoice information related to the city, a district taxation bureau can only access invoice information related to the district, a billing agent service provider can only access invoice information related to the enterprise for which the billing agent service provider acts as an agent, and the like.

The implementation details of the data management solutions for a blockchain system in the embodiments of this application are described in detail in the following.

Figure 4:
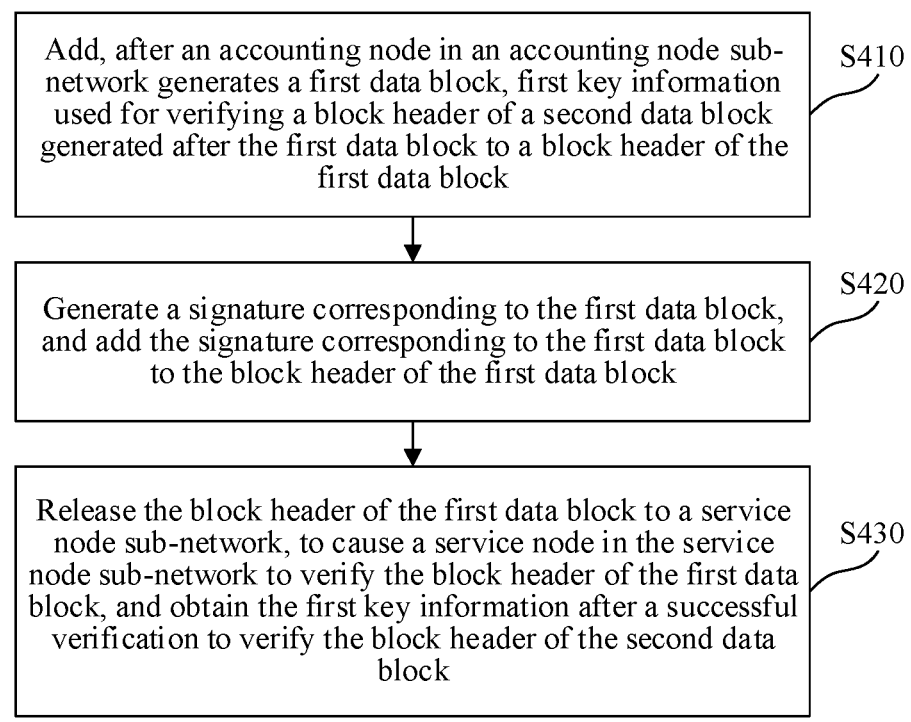
FIG. 4 is a schematic flowchart of a data management method for a blockchain system according to an embodiment of this application.

FIG. 4 is a schematic flowchart of a data management method for a blockchain system according to an embodiment of this application. As shown in FIG. 1 to FIG. 3, the blockchain system includes an accounting node sub-network 2 and a service node sub-network 1. The accounting node sub-network 2 includes an accounting node 21, and the service node sub-network 1 includes a service node 11. The data management method for a blockchain system shown in FIG. 4 may be performed by the accounting node 21 in the accounting node sub-network 2, or may be performed by an agent node (for example, the agent node 12 shown in FIG. 1 to FIG. 3, or a node independent of the accounting node sub-network and the service node sub-network) connected to the accounting node sub-network and the service node sub-network. Referring to FIG. 4, the data management method for a blockchain system includes at least step S410 to step S430. A detailed description is as follows:

Step S410. Add, after the accounting node in the accounting node sub-network generates a first data block, first key information used for verifying a block header of a second data block generated after the first data block to a block header of the first data block.

In an embodiment of this application, the data block may be generated through packaging according to to-be-chained transaction data (for example, billing data, invoice flow data, and the like, and the to-be-chained transaction data may be transmitted by the service node in the service node sub-network). For example, transaction data may be cached first after being received, and the cached transaction data may be packaged to generate a data block when at least one of the following packaging requirements is satisfied:

a total size of the to-be-chained transaction data in the cache reaches a predetermined size threshold;

a total quantity of the to-be-chained transaction data in the cache reaches a predetermined quantity threshold; and a time between a cache time of an earliest piece of cached to-be-chained transaction data in the to-be-chained transaction data in the cache and a current time reaches a predetermined time threshold.

In an embodiment of this application, in a case that the block packaging requirement is that a total size of the to-be-chained transaction data in the cache exceeds the predetermined size threshold, for example, the predetermined size threshold is 4 Mb, there are two pieces of transaction data in the cache originally, which are 0.8 Mb and 1.5 Mb respectively, and if another piece of to-be-chained transaction data of 2 Mb is received at this time, and 0.8 Mb+1.5 Mb+2 Mb=4.3 Mb>4 Mb, a data block may be generated for the three pieces of transaction data, so as to avoid the waste of resources caused by generating a data block for each piece of transaction data.

In an embodiment of this application, in a case that the block packaging requirement is that a total quantity of the to-be-chained transaction data in the cache exceeds the predetermined quantity threshold, for example, the predetermined quantity threshold is 5, there are four pieces of transaction data in the cache originally, and if another piece of to-be-chained transaction data is received at this time, a data block may be generated for the five pieces of transaction data, so as to avoid the waste of resources caused by generating a data block for each piece of transaction data.

In an embodiment of this application, in a case that the block packaging requirement is that a time between a cache time of an earliest piece of cached to-be-chained transaction data in the to-be-chained transaction data in the cache and a current time reaches a predetermined time threshold, for example, the predetermined time threshold is 24 hours, and if a piece of to-be-chained transaction data is put into the cache at 11:27:01 on Apr. 25, 2018, a data block may be generated for the to-be-chained transaction data at 11:27:01 on April 26, so as to avoid excessive latency from a time of requesting to be chained to a time of being actually chained.

In practice, a combination of one or more of the foregoing packaging requirements may be used. For example, if a total size of the to-be-chained transaction data in the cache reaches a predetermined size threshold, or a time between a cache time of an earliest piece of cached to-be-chained transaction data in the to-be-chained transaction data in the cache and a current time reaches a predetermined time threshold, a data block may be generated, so as to not only avoid the waste of resources caused by generating a data block for a piece of transaction data, but also avoid unlimited waiting caused by receiving insufficient transaction data in a period of time In an embodiment of this application, after the data block is generated, the generated data block may be released to the accounting node sub-network, and accounting nodes are to reach a consensus on the data block. After the consensus is successful, the data block is added to the blockchain.

Figure 5:
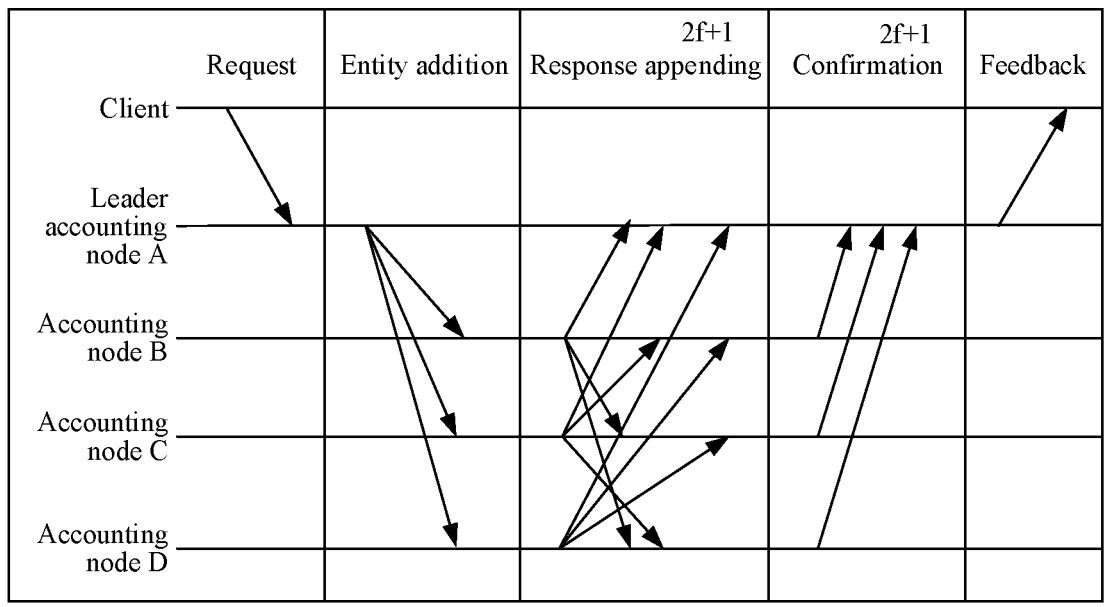
FIG. 5 is a schematic flowchart of reaching a consensus on a data block according to an embodiment of this application.

Specifically, in an embodiment of this application, for example, FIG. 5 shows a process in which a leader accounting node broadcasts the data block to other accounting nodes in the accounting node sub-network for consensus according to an embodiment of this application. In a request stage, a client (may be an accounting node for forming a data block to be recorded on the blockchain) initiates a consensus request, and transmits the consensus request to a leader accounting node A in a leadership state; the process continues to enter an entity-adding stage, the leader accounting node A broadcasts a data block corresponding to the consensus request to other accounting nodes (accounting nodes B, C, D, . . . ) not in a leadership state in the accounting node sub-network; the process continues to enter a response appending stage, other accounting nodes broadcast received consensus content to other accounting nodes; and in a case that the received consensus content broadcast by a preset quantity (2f+1) of other accounting nodes is consistent, the process enters a confirmation stage, each accounting node feeds back a confirmation result to the leader accounting node A. After the leader accounting node A receives the confirmation fed back by the preset quantity (2f+1) of other blockchain nodes, it is determined that the consensus is reached and a result of reaching the consensus is fed back to the client, where f is a largest integer less than (N−1)/3, and N is a quantity of accounting nodes in the accounting node sub-network; and f is a quantity of misbehaving accounting nodes in the accounting node sub-network that an algorithm can tolerate.

After the consensus is reached, each accounting node in the accounting node sub-network may add the data block to the blockchain, that is, chaining is completed.

In an embodiment of this application, a certificate corresponding to a second data block may be obtained from a certificate authority, and the obtained certificate is used as the first key information. Further, the service node may verify an encryption key of a block header of the second data block through the certificate.

In an embodiment of this application, a public key and a private key corresponding to the second data block may be obtained from the certificate authority, and the obtained public key is used as the first key information. Further, the service node may verify the block header of the second data block through the public key.

In an embodiment of this application, the adding the first key information to the block header of the first data block may be specifically: adding the first key information to a designated field included in the block header of the first data block, to instruct the service node to verify the block header of the second data block through the first key information.

In an embodiment of this application, to save bytes and reduce a data amount of the block header, the foregoing designated field may be set to null in a case that the first key information is the same as key information used for verifying the block header of the first data block. That is, if the key information used for verifying a subsequent block header does not change, the designated field used for indicating the key information in the block header may be set to null.

Still refer to FIG. 4. Step S420. Generate a signature corresponding to the first data block, and add the signature corresponding to the first data block to the block header of the first data block.

Figure 6:
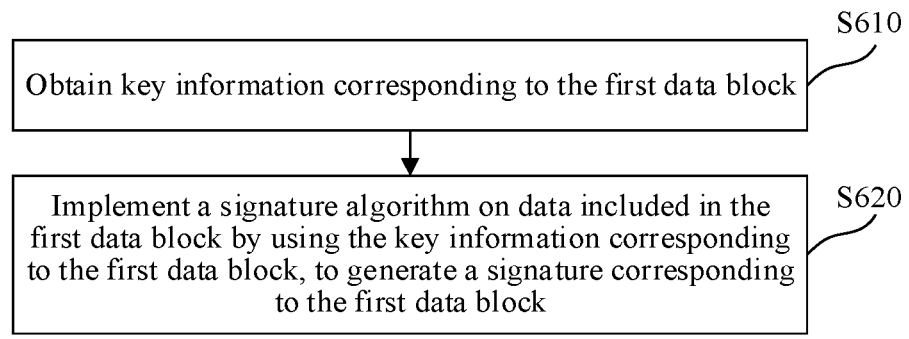
FIG. 6 is a schematic flowchart of generating a signature corresponding to a first data block according to an embodiment of this application.

In an embodiment of this application, as shown in FIG. 6, the generating a signature corresponding to the first data block in step S420 includes the following steps.

S610. Obtain a signature key corresponding to the first data block.

Figure 7:
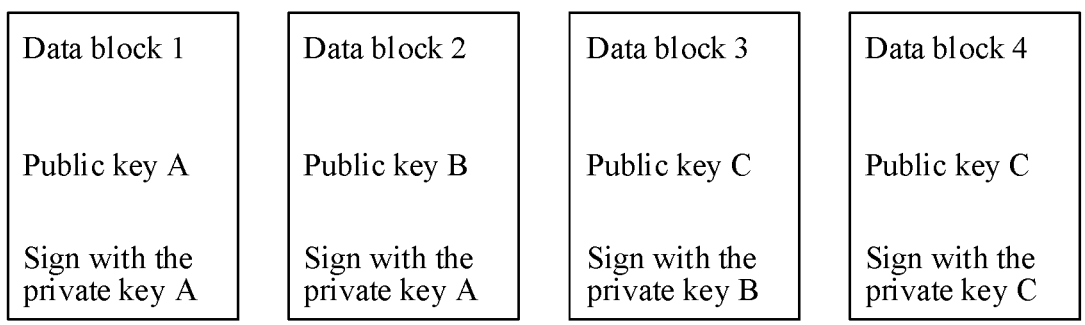
FIG. 7 is a schematic structural diagram of a block header of a data block according to an embodiment of this application.

In an embodiment of this application, if the first data block is a genesis block, a signature key corresponding to the first data block may be predetermined key information; and if the first data block is not the genesis block, a signature key corresponding to the first data block needs to correspond to the key information indicated in the previous data block. A first block to be built in a blockchain is referred to as the genesis block. Specifically, as shown in FIG. 7, a block header of a data block 1 indicates that a public key A is adopted for verifying a block header of a data block 2, the block header of the data block 2 indicates that a public key B is adopted for verifying a block header of a data block 3, the block header of the data block 3 indicates that a public key C is adopted for verifying a block header of a data block 4, and then a signature key corresponding to the data block 2 is a private key A corresponding to the public key A, further to sign with the private key A; similarly, a signature key corresponding to the data block 3 is a private key B corresponding to the public key B, further to sign with the private key B.

S620. Implement a signature algorithm on data included in the first data block by using the signature key corresponding to the first data block, to generate a signature corresponding to the first data block.

In an embodiment of this application, the signature algorithm may be a message digest algorithm, a digest encryption algorithm, or the like.

Still refer to FIG. 4. Step S430. Release the block header of the first data block to the service node sub-network, to cause the service node in the service node sub-network to verify the block header of the first data block, and obtain the first key information after a successful verification to verify the block header of the second data block.

Figure 8:
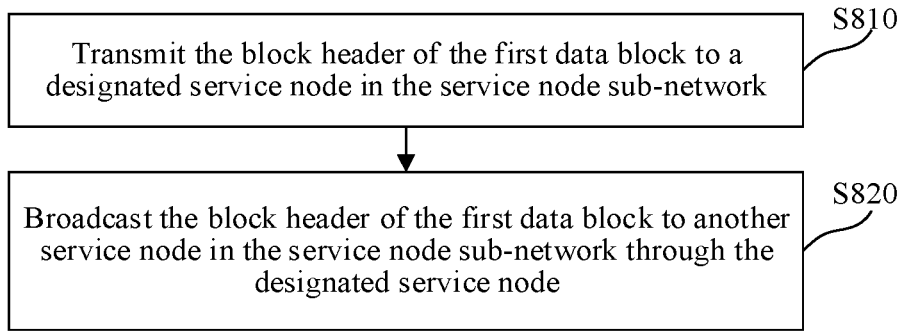
FIG. 8 is a schematic flowchart of releasing a block header of a first data block to a service node sub-network according to an embodiment of this application.

In an embodiment of this application, as shown in FIG. 8, the process of releasing the block header of the first data block to the service node sub-network in step S430 includes the following steps.

Step S810. Transmit the block header of the first data block to a designated service node in the service node sub-network.

Step S820. Broadcast the block header of the first data block to another service node in the service node sub-network through the designated service node.

The embodiment is applied to the system architecture of the blockchain system shown in FIG. 2. In this system architecture, a service node in the service node sub-network may be used as an agent node, and then the block header of the data block is transmitted to all service nodes in the service node sub-network in a broadcasting manner. The advantage of the embodiment is that, the block header may be notified to all service nodes in the service node sub-network rapidly.

In addition to the communication manner of broadcasting a message shown in FIG. 2, the service node sub-network may alternatively adopt a P2P network communication manner shown in FIG. 1 and FIG. 3. In a P2P service node sub-network, an agent node may transmit a block header to a service node near the agent node, and then the service node receiving the block header transmits the block header to another service node near the service node, until all service nodes in the service node sub-network receive the block header.

Figure 9:
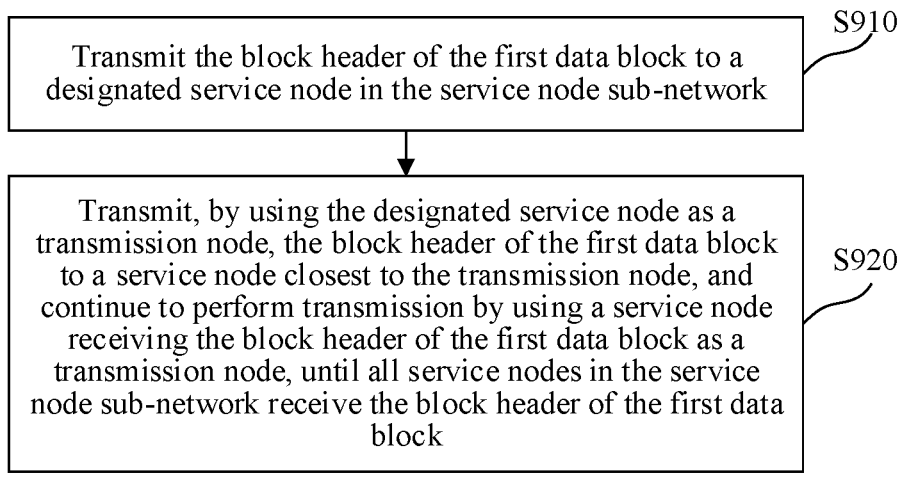
FIG. 9 is a schematic flowchart of releasing a block header of a first data block to a service node sub-network according to an embodiment of this application.

In an embodiment of a P2P networking form, as shown in FIG. 9, a process of releasing the block header of the first data block to the service node sub-network includes the following steps.

Step S910. Transmit the block header of the first data block to a designated service node in the service node sub-network.

Step S920. Transmit, by using the designated service node as a transmission node, the block header of the first data block to a service node closest to the transmission node, and continue to perform transmission by using a service node receiving the block header of the first data block as a transmission node, until all service nodes in the service node sub-network receive the block header of the first data block.

In step S920, it is of no significance for a service node that has already received a block header to receive the same block header repeatedly. Therefore, when determining a next service node to which the block header is to be transmitted, each service node not only needs to give priority to transmitting the block header to a service node (to reduce a transmission waiting time) closest to the each service node, but also needs to consider to transmit the block header to a service node that has not received the block header yet. In this case, each service node needs to transmit the block header to only one service node, and the one service node is a service node closest to the each service node in other service nodes that have not received the block header yet. In this case, the block header is delivered one node by one node securely, and meanwhile, a delivery burden is prevented from being concentrated on one service node, thereby implementing load balancing.

Figure 10:
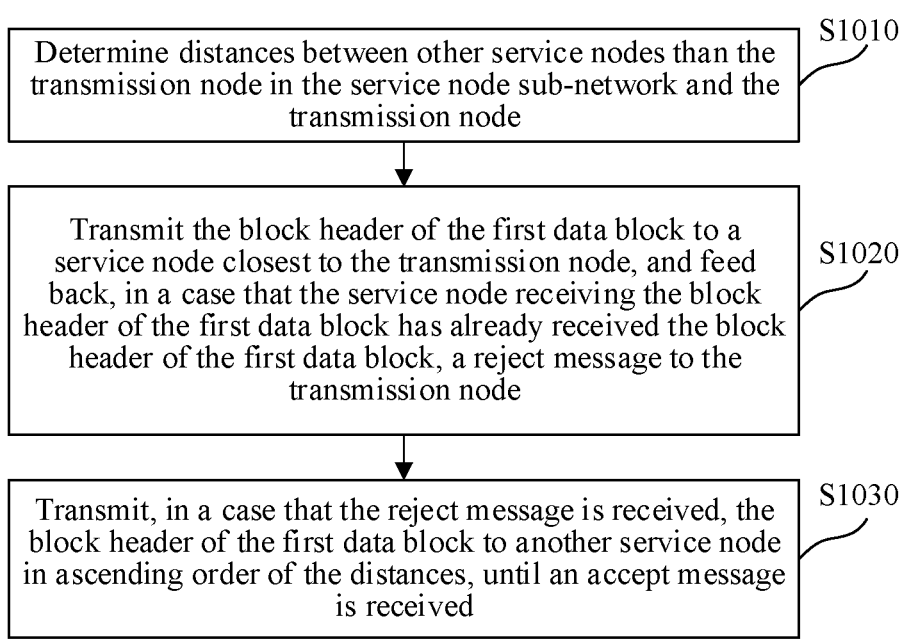
FIG. 10 is a schematic flowchart of transmitting a block header of a first data block to a service node closest to a transmission node according to an embodiment of this application.

In an embodiment of this application, as shown in FIG. 10, the transmitting a block header of a first data block to a service node closest to a transmission node in step S920 may include the following steps.

Step S1010. Determine distances between other service nodes than the transmission node in the service node sub-network and the transmission node.

Step S1020. Transmit the block header of the first data block to a service node closest to the transmission node, and return, in a case that the service node receiving the block header of the first data block has already received the block header of the first data block, a reject message to the transmission node.

Step S1030. Transmit, in a case that the reject message is received, the block header of the first data block to another service node in ascending order of the distances, until an accept message is received.

In an embodiment of this application, the determining distances between other service nodes than the transmission node in the service node sub-network and the transmission node in step S1010 may include: periodically (for example, every 5 seconds) receiving positioning information broadcast from the other service nodes in the service node sub-network, and calculating, according to last-received positioning information broadcast by each of the other service nodes and positioning information of the transmission node, a distance between the each of the other service nodes and the transmission node.

In an embodiment of this application, the positioning information is position information of a service node obtained by the service node from its own positioning system (for example, a GPS system installed on the node). The service node obtains its own positioning information from the installed positioning system, and then periodically (for example, every 5 seconds) broadcasts the positioning information to other service nodes in the service node sub-network. The transmission node may also obtain its own positioning information from its own positioning system. The broadcast and update of the positioning information are periodical, and the period is relatively short. Therefore, the positioning information broadcast by the each of the other service nodes and last received by the transmission node may be considered as current positioning information of the each of the other service nodes. In this case, the distance between the each of the other service nodes and the transmission node may be calculated according to the last-received positioning information broadcast by the each of the other service nodes and the positioning information of the transmission node.

With the foregoing calculated distances, another service node closest to the transmission node in all other service nodes may be found, but the another service node may have received the block header already. Therefore, according to the embodiments of this application, the block header is prevented from being transmitted to one service node repeatedly by letting the other service nodes receiving the block header transmit an accept message or a reject message. A difference between the accept message and the reject message is that, specific identification fields thereof are set as different characters or character strings, to represent the accept message and the reject message. In this case, the transmission node may recognize, by recognizing the specific identification field in the received message, whether the received message is the accept message or the reject message. If the received message is the accept message, it indicates that the service node receiving the block header has not received the block header before, and therefore, the block header is accepted. If the received message is the reject message it indicates that the service node receiving the block header has received the block header before, and therefore, the block header is rejected. In a case of receiving a reject message, the transmission node needs to find another service node second closest to the transmission node; and then transmits the block header to the another service node and determines whether the another service node feeds back a reject message or an accept message. If it is still the reject message, the transmission node needs to find another service node third closest to the transmission node; and then transmits the block header to the another service node and determines whether the another service node feeds back a reject message or an accept message. That is, if a reject message is received, the transmission node continues to transmit the block header to other service node in ascending order of the distances between the service nodes and the transmission node, until an accept message is received.

Another implementation of finding a service node that has not received the block header in the other service nodes and that is closest to the transmission node is to maintain a distribution progress record server. Each time one of the other service nodes receives the block header, a record request is transmitted to the distribution progress record server. The record request includes an identifier of the service node and an identifier of the block header (for example, a Merkle root), and the distribution progress record server stores the identifier of the service node and the identifier of the block header correspondingly. In a case that a service node that has not received the block header in the other service nodes and that is closest to the transmission node is to be determined, the transmission node first transmits a request to the distribution progress record server, and then the distribution progress record server queries an identifier (removing the identifier of the service node stored correspondingly to the identifier of the block header from an identifier list of all service nodes) of a service node that has not received the block header in the service node sub-network, and then transmits the identifier to the transmission node. The transmission node determines a service node closest to the transmission node from the service nodes that have not received the block header. In comparison, in a manner of transmitting the block header to another closest service node to let the another service node receiving the block header transmit an accept message or a reject message according to whether the another service node has received the block header before, a server is removed, so as to save network resources and avoid network congestion.

Figure 11:
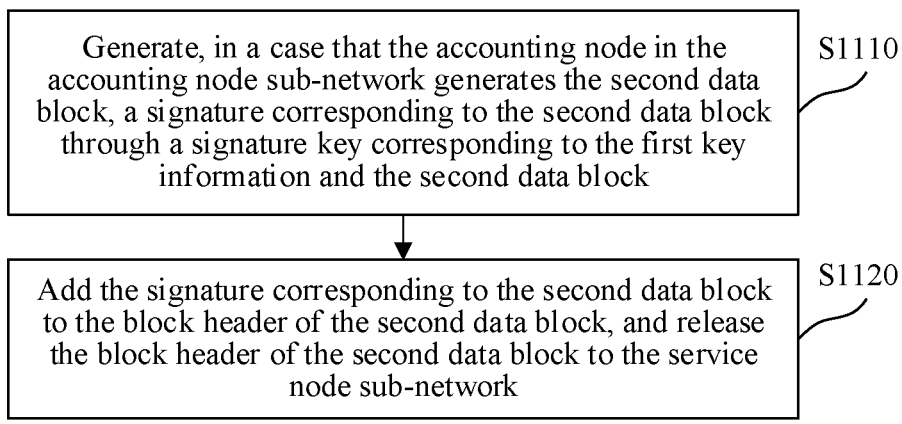
FIG. 11 is a schematic flowchart of a data management method for a blockchain system according to an embodiment of this application.

Based on the technical solutions of the foregoing embodiments, in an embodiment of this application, as shown in FIG. 11, a data management method for a blockchain system according to an embodiment of this application includes the following steps.

Step S1110. Generate, in a case that the accounting node in the accounting node sub-network generates the second data block, a signature corresponding to the second data block through a signature key corresponding to the first key information and the second data block.

In an embodiment of this application, the first key information is key information for verifying the second data block, and the signature key corresponding to the first key information is a key for signing the second data block. Specifically, as shown in FIG. 7, the signature key corresponding to the data block 2 is the private key A corresponding to the public key A; and the signature key corresponding to the data block 3 is the private key B corresponding to the public key B.

For a process of generating the data block and a process of generating the signature corresponding to the second data block, reference is made to the technical solutions of the foregoing embodiments. Details are not described again.

Step S1120. Add the signature corresponding to the second data block to the block header of the second data block, and release the block header of the second data block to the service node sub-network.

For a process of adding the signature corresponding to the second data block to the block header of the second data block and a process of releasing the block header of the second data block to the service node sub-network, reference is made to the technical solutions of the foregoing embodiments. Details are not described again.

Figure 12:
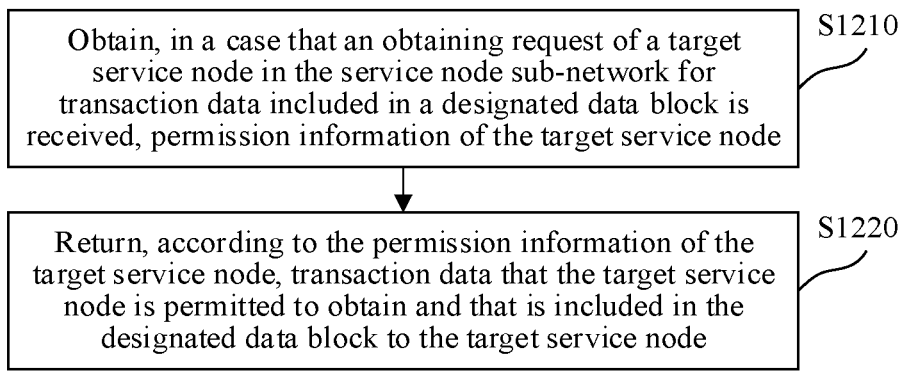
FIG. 12 is a schematic flowchart of a data management method for a blockchain system according to an embodiment of this application.

Based on the technical solutions of the foregoing embodiments, in an embodiment of this application, as shown in FIG. 12, a data management method for a blockchain system according to an embodiment of this application includes the following step S1210 and step S1220. A detailed description is as follows:

Step S1210. Obtain, in a case that an obtaining request of a target service node in the service node sub-network for transaction data included in a designated data block is received, permission information of the target service node.

In the embodiments of this application, the permission information of the service node refers to information representing which transaction data in the data block that the service node is permitted to obtain and which transaction data that the service node is not permitted to obtain. In an embodiment of this application, the permission in the permission information includes one or more of the following:

a chaining request service node corresponding to the transaction data that is permitted to be viewed;

a transaction type corresponding to the transaction data that is permitted to be viewed; and a chaining time corresponding to the transaction data that is permitted to be viewed.

The chaining request service node corresponding to the transaction data that is permitted to be viewed refers to a service node that is permitted to view transaction data that the service node requests to be chained. In an embodiment of this application, it may be stipulated that a service node can only view the transaction data that the service node requests to be chained. Assuming that there is a service node A, and its permission information may stipulate that the chaining request service node corresponding to the transaction data that is permitted to be viewed is the service node A. In this case, only a data block that the service node A requests to be chained can be viewed by the service node A. In another embodiment, it may be stipulated that a service node may view transaction data that the service node and all subordinate service nodes of the service node request to be chained. For example, there is a service node A, and its subordinate service nodes are A1-A7. In this case, chaining request service nodes corresponding to transaction information that the service node A is permitted to view are the service node A and the service nodes A1-A7, and further, a data block that any one of the service node A and the service nodes A1-A7 requests to be chained can be viewed by the service node A.

The transaction type corresponding to the transaction data that is permitted to be viewed refers to a permission to view which transaction types of transaction data. The transaction data in the data block carries the transaction type. The transaction type may be, for example, an invoice transaction, a supply-chain finance transaction, a digital legal tender transaction, or the like. In the invoice transaction, a service node of a local taxation authority may be permitted to view all transaction data related to the invoice within its jurisdiction, and therefore, all the transaction data related to the invoice in the data block may be returned to the service node. In the supply-chain finance transaction, a service node of a bank may be permitted to view all transaction data related to the supply-chain finance within its jurisdiction, and therefore, all the transaction data related to the supply-chain finance in the data block may be returned to the service node. In the digital legal tender transaction, a service node of an issuing authority of the digital legal tender may be permitted to view all transaction data related to the digital legal tender flow within its jurisdiction, and therefore, all the transaction data related to the digital legal tender in the data block may be returned to the service node.

The chaining time corresponding to the transaction data that is permitted to be viewed refers to a permission to view a time period in which transaction data is chained. For example, it may be stipulated that the service node A can only view transaction data chained within the latest one year.

The foregoing types of permissions may alternatively be used in combination. For example, the chaining request service node corresponding to the transaction data that is permitted to be viewed and the chaining time corresponding to the transaction data that is permitted to be viewed may be used in combination. Assuming that there is a service node A and its subordinate service nodes are A1-A7, its permission data may stipulate: the service node A may obtain transaction data of the service node A and the service nodes A1-A7 that is chained within the latest one year.

In an embodiment of this application, authentication information of a target service node may be obtained according to identification information of the target service node included in an obtaining request transmitted by the target service node, and then permission information of the target service node is obtained based on the authentication information. The authentication information of the service node may be information obtained by the service node in advance through registration. For example, the service node may transmit a registration request to the accounting node sub-network, and then the accounting node sub-network may obtain a network access contract corresponding to the service node, the network access contract including the authentication information and the permission information of the service node; and further adds the network access contract to the data block and add the data block to the blockchain. All content in the data block on the blockchain is completely viewable to the accounting node. Therefore, after receiving a request of the service node for the transaction data in the data block, the accounting node finds, according to the identification information of the requesting service node, a network access contract stored correspondingly to the identification information of the service node from the blockchain, further to read the permission information from the network access contract.

Step S1220. Return, according to the permission information of the target service node, transaction data that the target service node is permitted to obtain and that is included in the designated data block to the target service node.

In this embodiment of this application, after the data block is generated, the accounting node only transmits the block header to the service nodes in the service node sub-network, and the service nodes cannot obtain transaction data in a block body in the data block, thereby hiding the transaction data. When the service node intends to obtain the transaction data in the data block, the service node needs to transmit an obtaining request for the transaction data in the data block to the accounting node, and the accounting node only transmits transaction data (for example, transaction data related to the service node, or transaction data related to its subordinate) that the service node is permitted to view to the service node for viewing, and the service node is prohibited from viewing transaction data (for example, transaction data related to other service nodes) that the service node is not permitted to view. Further, not only the service node can learn transaction data related to service node, but also a problem of leakage of transaction data related to other service nodes can be avoided.

Figure 13:
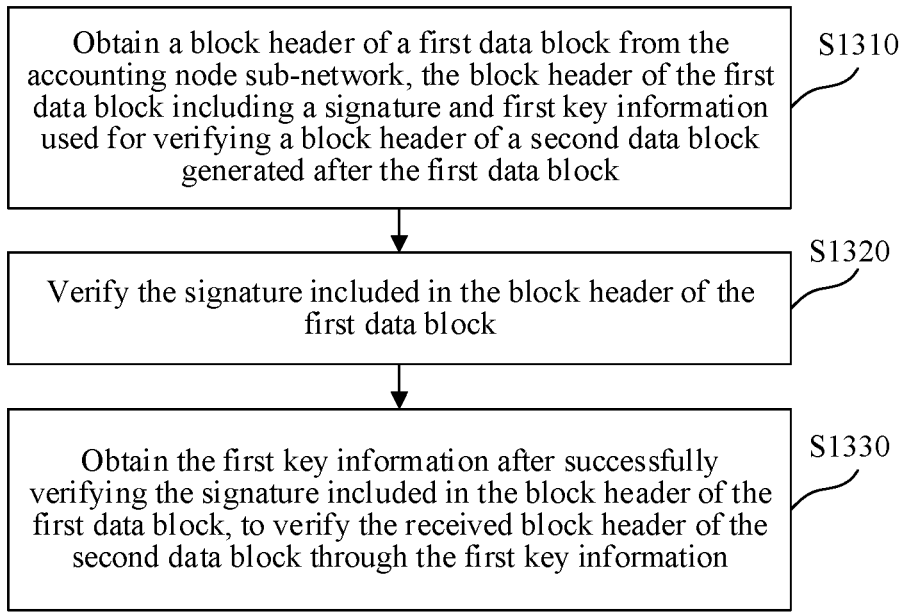
FIG. 13 is a schematic flowchart of a data management method for a blockchain system according to an embodiment of this application.

FIG. 13 is a schematic flowchart of a data management method for a blockchain system according to an embodiment of this application. As shown in FIG. 1 to FIG. 3, the blockchain system includes an accounting node sub-network 2 and a service node sub-network 1. The accounting node sub-network includes an accounting node for recording a data block on a blockchain, and the service node sub-network includes a service node for verifying the data block recorded by the accounting node on the blockchain. The data management method for a blockchain system shown in FIG. 13 may be performed by the service node in the service node sub-network. Referring to FIG. 13, the data management method for a blockchain system includes at least step S1310 to step S1330. A detailed description is as follows:

Step S1310. Obtain a block header of a first data block from the accounting node sub-network, the block header of the first data block including a signature and first key information used for verifying a block header of a second data block generated after the first data block.

In an embodiment of this application, a process in which the accounting node sub-network generates the first data block, and a process of releasing the block header of the first data block to the service node sub-network are described in detail in the foregoing embodiments, and therefore details are not described again.

Step S1320. Verify the signature included in the block header of the first data block.

In an embodiment of this application, as described in the foregoing embodiments, in a case that the first data block is a genesis block, the signature included in the first data block may be verified based on predetermined key information. If the first data block is not the genesis block, a block header of a third data block from the accounting node sub-network may be received, the third data block being generated before the first data block; and then the second key information used for verifying the block header of the first data block is obtained from the block header of the third data block, further to verify the signature included in the block header of the first data block based on the second key information.

Specifically, as shown in FIG. 7, a block header of a data block 1 indicates that a public key A is adopted for verifying a block header of a data block 2, the block header of the data block 2 indicates that a public key B is adopted for verifying a block header of a data block 3, the block header of the data block 3 indicates that a public key C is adopted for verifying a block header of a data block 4, and then the signature included in the block header of the data block 2 may be verified according to the public key A indicated in the block header of the data block 1; similarly, a signature included in the block header of the data block 3 is verified according to the public key B indicated in the block header of the data block 2.

Step S1330. Obtain the first key information after successfully verifying the signature included in the block header of the first data block, to verify the received block header of the second data block through the first key information.

According to the technical solution of the embodiment shown in FIG. 13, key information adopted for verifying a block header of a next data block may be obtained only in a case that a verification of a block header of a current data block is successful, thereby ensuring the security of the block header data, and flexibly updating a block header verification key at the same time, which avoids the inconvenience caused by inflexible key replacement, and also avoids the possibility of data insecurity due to the use of fixed keys.

Figure 14:
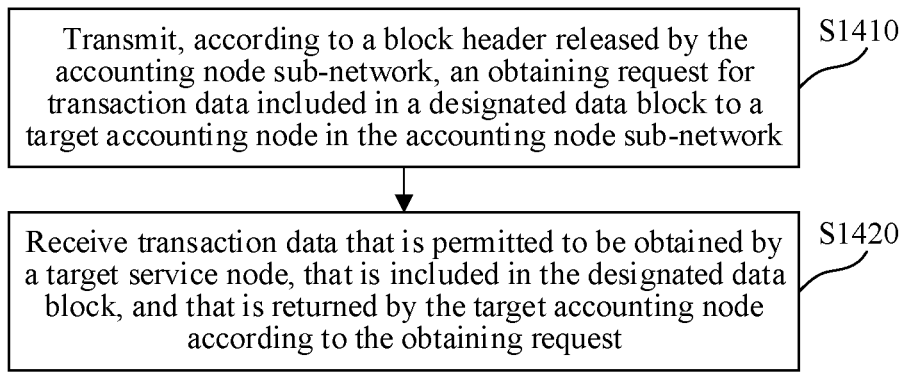
FIG. 14 is a schematic flowchart of a data management method for a blockchain system according to an embodiment of this application.

Based on the technical solutions of the foregoing embodiments, in an embodiment of this application, as shown in FIG. 14, a data management method for a blockchain system according to an embodiment of this application includes the following steps.

Step S1410. Transmit, according to a block header released by the accounting node sub-network, an obtaining request for transaction data included in a designated data block to a target accounting node in the accounting node sub-network.

In an embodiment of this application, after receiving a block header released by the accounting node sub-network, the service node may determine, according to the block header, that a new data block is generated in the accounting node sub-network, and then may transmit an obtaining request for transaction data included in a designated data block to a target accounting node. The target accounting node may be any accounting node in the accounting node sub-network, or may be an accounting node closest to the service node transmitting the obtaining request in the accounting node sub-network, or may be an accounting node corresponding to the service node transmitting the obtaining request.

Step S1420. Receive transaction data that is permitted to be obtained by a target service node, that is included in the designated data block, and that is returned by the target accounting node according to the obtaining request.

After receiving the obtaining request transmitted by the service node, the accounting node may obtain permission information of the service node, and then obtain, according to the permission information, the transaction data that is permitted to be obtained by the service node. The process is described in the foregoing embodiments, and therefore details are not described again.

The following describes apparatus embodiments of this application, which may be used for performing the data management method for a blockchain system in the foregoing embodiments of this application. For details not disclosed in the apparatus embodiments of this application, reference is made to the foregoing embodiments of the data management method for a blockchain system of this application.

Figure 15:
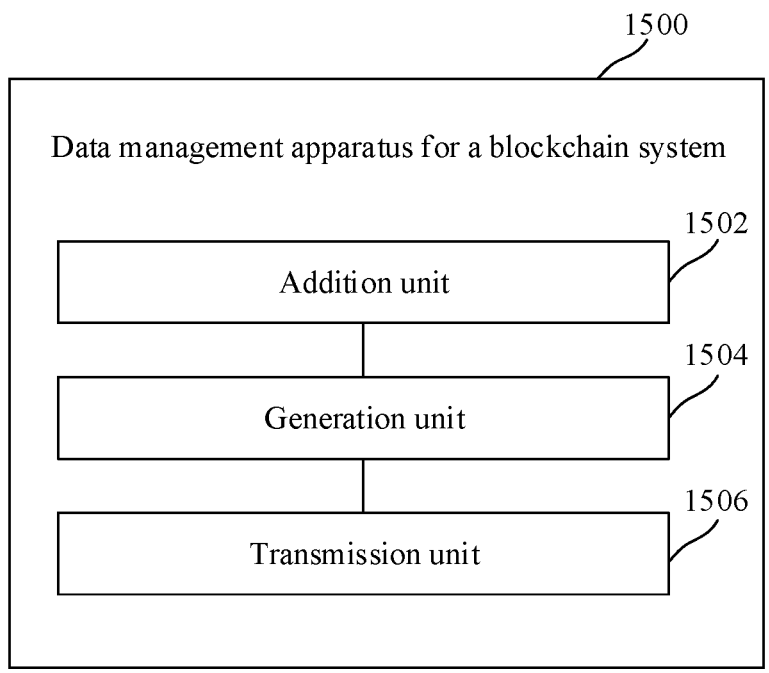
FIG. 15 is a schematic block diagram of a data management apparatus for a blockchain system according to an embodiment of this application.

FIG. 15 is a schematic block diagram of a data management apparatus for a blockchain system according to an embodiment of this application. As shown in FIG. 1 to FIG. 3, the blockchain system includes an accounting node sub-network 2 and a service node sub-network 1. The accounting node sub-network includes an accounting node for recording a data block on a blockchain, and the service node sub-network includes a service node for verifying the data block recorded by the accounting node on the blockchain. An accounting node 21 in the accounting node sub-network 2 may include the data management apparatus shown in FIG. 15. Alternatively, an agent node (for example, an agent node 12 shown in FIG. 1 to FIG. 3, or a node independent of the accounting node sub-network and the service node sub-network) connected to the accounting node sub-network and the service node sub-network may include the data management apparatus shown in FIG. 15.

Referring to FIG. 15, a data management apparatus 1500 for a blockchain system according to an embodiment of this application includes: an addition unit 1502, a generation unit 1504, and a transmission unit 1506.

The addition unit 1502 is configured to add, after the accounting node in the accounting node sub-network generates a first data block, first key information used for verifying a block header of a second data block generated after the first data block to a block header of the first data block; the generation unit 1504 is configured to generate a signature corresponding to the first data block, and add the signature corresponding to the first data block to the block header of the first data block; and the transmission unit 1506 is configured to release the block header of the first data block to the service node sub-network, to cause the service node in the service node sub-network to verify the signature included in the block header of the first data block, and obtain the first key information after a successful verification to verify the block header of the second data block.

In an embodiment of this application, the addition unit 1502 is configured to add the first key information to a designated field included in the block header of the first data block, to instruct to verify the block header of the second data block through the first key information.

In an embodiment of this application, the addition unit 1502 is configured to set, in a case that the first key information is the same as key information used for verifying the block header of the first data block, the designated field to null.

In an embodiment of this application, the data management apparatus 1500 for a blockchain system further includes: a first obtaining unit, configured to obtain a certificate corresponding to the second data block from a certificate authority, and use the obtained certificate as the first key information; and/or obtain a public key and a private key corresponding to the second data block from the certificate authority, and use the obtained public key as the first key information.

In an embodiment of this application, the generation unit 1504 is configured to obtain a signature key corresponding to the first data block; and implement a signature algorithm on data included in the first data block by using the signature key corresponding to the first data block, to generate a signature corresponding to the first data block.

In an embodiment of this application, the generation unit 1504 is further configured to generate, after the accounting node in the accounting node sub-network generates the second data block, a signature corresponding to the second data block through a signature key corresponding to the first key information and the second data block; the addition unit is further configured to add the signature corresponding to the second data block to the block header of the second data block; and the transmission unit 1506 is further configured to release the block header of the second data block to the service node sub-network.

In an embodiment of this application, the data management apparatus 1500 for a blockchain system further includes: a second obtaining unit, configured to obtain, after an obtaining request of a target service node in the service node sub-network for transaction data included in a designated data block is received, permission information of the target service node; and the transmission unit 1506 is further configured to return, according to the permission information of the target service node, transaction data that the target service node is permitted to obtain and that is included in the designated data block to the target service node.

Figure 16:
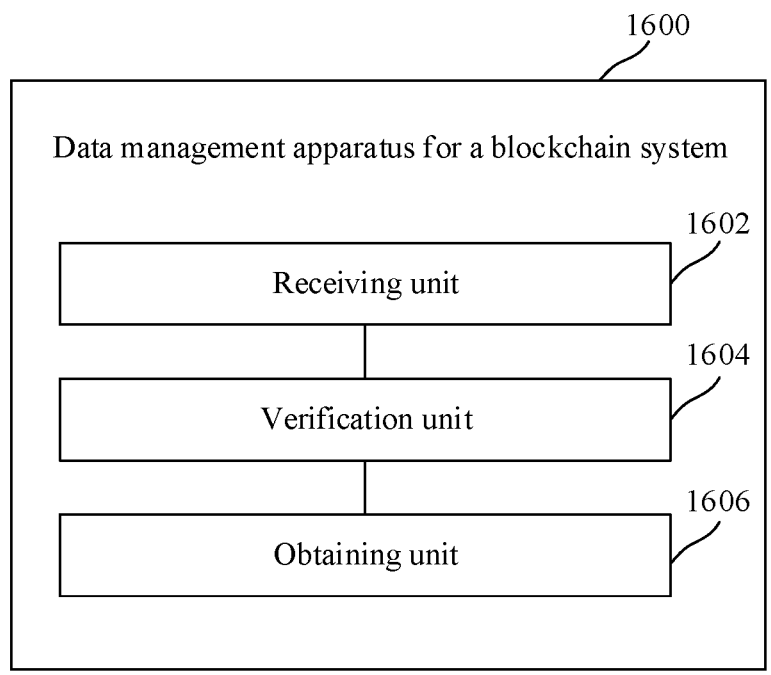
FIG. 16 is a schematic block diagram of a data management apparatus for a blockchain system according to an embodiment of this application.

FIG. 16 is a schematic block diagram of a data management apparatus for a blockchain system according to an embodiment of this application. As shown in FIG. 1 to FIG. 3, the blockchain system includes an accounting node sub-network 2 and a service node sub-network 1. The accounting node sub-network 2 includes an accounting node 21, and the service node sub-network 1 includes a service node 11. The service node 11 in the service node sub-network 1 may include the data management apparatus shown in FIG. 16.

Referring to FIG. 16, a data management apparatus 1600 for a blockchain system according to an embodiment of this application includes: a receiving unit 1602, a verification unit 1604, and an obtaining unit 1606.

The receiving unit 1602 is configured to receive a block header of a first data block from the accounting node sub-network, the block header of the first data block including a signature and first key information used for verifying a block header of a second data block generated after the first data block; the verification unit 1604 is configured to verify the signature included in the block header of the first data block; and the obtaining unit 1606 is configured to obtain the first key information after successfully verifying the signature included in the block header of the first data block, to verify the received block header of the second data block through the first key information.

In an embodiment of this application, the verification unit 1604 is configured to receive a block header of a third data block from the accounting node sub-network, the third data block being generated before the first data block; obtain the second key information used for verifying the block header of the first data block from the block header of the third data block; and verify the signature included in the block header of the first data block based on the second key information.

In an embodiment of this application, the verification unit 1604 is configured to verify, in a case that the first data block is a genesis block, the signature included in the first data block based on predetermined key information.

In an embodiment of this application, the data management apparatus 1600 for a blockchain system further includes: a transmission unit, configured to transmit, according to a block header released by the accounting node sub-network, an obtaining request for transaction data included in a designated data block to a target accounting node in the accounting node sub-network; and the receiving unit 1602 is further configured to receive transaction data that is permitted to be obtained by a target service node, that is included in the designated data block, and that is returned by the target accounting node according to the obtaining request.

Figure 17:
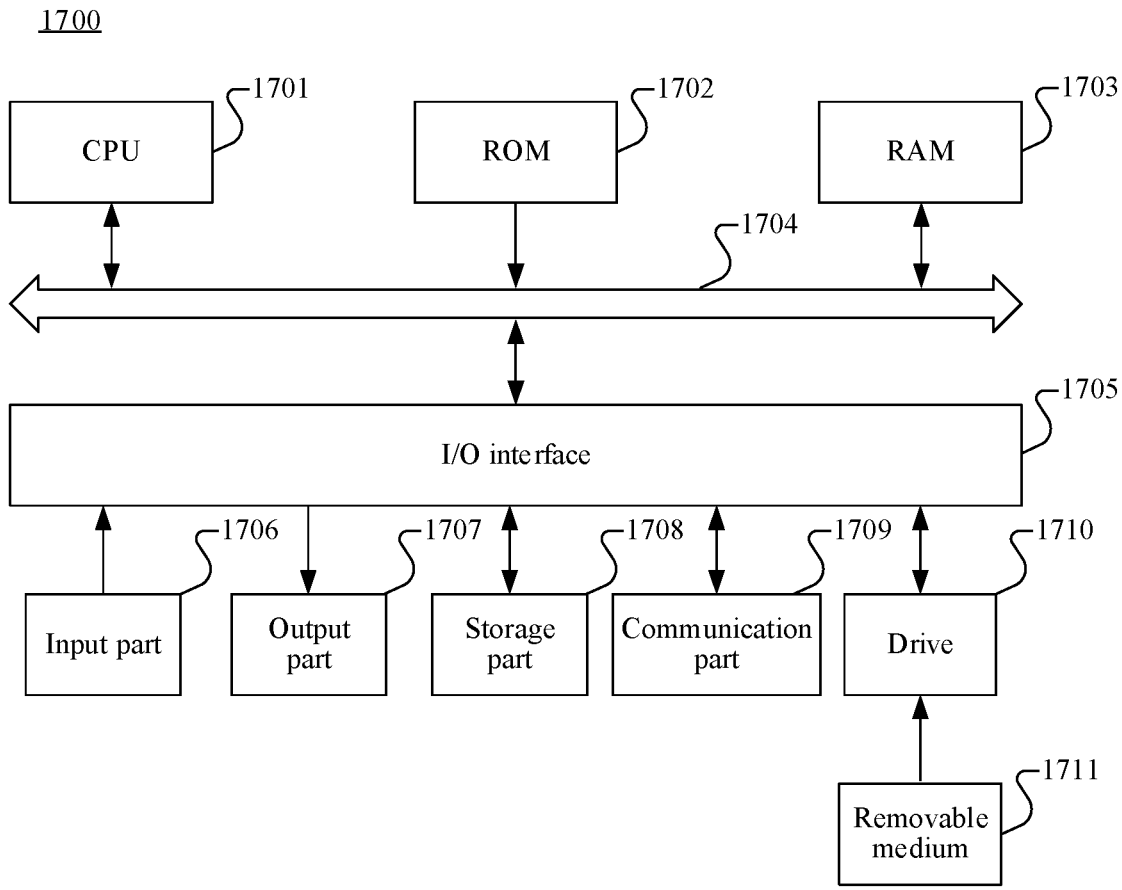
FIG. 17 is a schematic structural diagram of a computer system adapted to implement an electronic device according to an embodiment of this application.

FIG. 17 is a schematic structural diagram of a computer system adapted to implement an electronic device according to an embodiment of this application.

A computer system 1700 of the electronic device shown in FIG. 17 is only an example, and is not to impose any restriction on functions and scopes of use of the embodiments of this application.

As shown in FIG. 17, the computer system 1700 includes a central processing unit (CPU) 1701, which may perform various proper actions and processing based on a program stored in a read-only memory (ROM) 1702 or a program loaded from a storage part 1708 into a random access memory (RAM) 1703, for example, perform the method in the foregoing embodiments. In the RAM 1703, various programs and data necessary for system operations are further stored. The CPU 1701, the ROM 1702, and the RAM 1703 are connected to each other through a bus 1704. An input/output (I/O) interface 1705 is also connected to the bus 1704.

The following components are connected to the I/O interface 1705: an input part 1706 including a keyboard, a mouse, or the like, an output part 1707 including a cathode ray tube (CRT), a liquid crystal display (LCD), a speaker, or the like, a storage part 1708 including a hard disk, or the like, and a communication part 1709 including a network interface card such as a local area network (LAN) card or a modem. The communication part 1709 performs a communication processing through a network such as the Internet. A drive 1710 is also connected to the I/O interface 1705 as required. A removable medium 1711 such as a magnetic disk, an optical disc, a magneto-optical disk, or a semiconductor memory is installed on the drive 1710 as required, so that a computer program read from the removable medium 1711 is installed into the storage part 1708 as required.

Particularly, according to the embodiments of this application, the processes described below by referring to the flowcharts may be implemented as computer software programs. For example, this embodiment of this application includes a computer program product, the computer program product includes a computer program carried on a computer-readable medium, and the computer program includes program code used for performing the methods shown in the flowcharts. In such an embodiment, the computer program may be downloaded and installed through the communication part 1709 from a network, and/or installed from the removable medium 1711. When the computer program is executed by the CPU 1701, various functions defined in the system of this application are executed.

The computer-readable medium shown in the embodiments of this application may be a computer-readable signal medium or a computer-readable storage medium, or any combination of the two. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, an apparatus, or a device. In this application, a computer-readable signal medium may include a data signal being in a baseband or propagated as a part of a carrier wave, the data signal carrying computer-readable program code. Such a propagated data signal may be in a plurality of forms, including but not limited to an electromagnetic signal, an optical signal, or any suitable combination thereof. The computer-readable signal medium may be further any computer-readable medium in addition to a computer-readable storage medium. The computer-readable medium may send, propagate, or transmit a program that is used by or used in combination with an instruction execution system, an apparatus, or a device. The program code included in the computer-readable medium may be transmitted by using any suitable medium, including but not limited to: a wireless medium, a wire medium, or the like, or any suitable combination thereof.

The flowcharts and block diagrams in the accompanying drawings illustrate possible system architectures, functions, and operations that may be implemented by a system, a method, and a computer program product according to various embodiments of this application. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a designated function or operation, or may be implemented by using a combination of dedicated hardware and a computer instruction.

A related unit described in the embodiments of this application may be implemented in a software manner, or may be implemented in a hardware manner, and the unit described can also be set in a processor. Names of the units do not constitute a limitation on the units in a specific case.

According to another aspect, this application further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, to cause the electronic device to implement the method described in the foregoing embodiments.

Although a plurality of modules or units of a device configured to perform actions are discussed in the foregoing detailed description, such division is not mandatory. Actually, according to the implementations of this application, the features and functions of two or more modules or units described above may be specifically implemented in one module or unit. Conversely, features and functions of one module or unit described above may be further divided into a plurality of modules or units for implementation.

Through the descriptions of the foregoing implementations, a person skilled in the art easily understands that the exemplary implementations described herein may be implemented through software, or may be implemented through software located in combination with necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this application.

A person skilled in the art can easily figure out another implementation solution of this application after considering the specification and practicing this application that is disclosed herein. This application is intended to cover any variation, use, or adaptive change of this application. The variations, uses, or adaptive changes follow the general principles of this application and include common general knowledge or common technical means in the art that are not disclosed in this application.

It is to be understood that this application is not limited to the precise structures that are described in the foregoing and that are shown in the accompanying drawings, and various modifications and changes may be made without departing from the scope of this application. The scope of this application is limited by the appended claims only.

What is claimed is:

1. A data management method for a blockchain system, the blockchain system comprising an accounting node sub-network and a service node sub-network, the accounting node sub-network comprising an accounting node, and the service node sub-network comprising a service node; and the data management method comprising:
   adding, after the accounting node in the accounting node sub-network generates a first data block, first key information used for verifying a block header of a second data block generated after the first data block to a block header of the first data block, wherein:
   in a case that the first key information is different from key information used for verifying the block header of the first data block, the first key information is added into a designated field in the block header of the first data block to instruct the service node to verify the block header of the second data block through the first key information, and
   in a case that the first key information is the same as the key information used for verifying the block header of the first data block, the designated field is set to null to instruct the service node to verify the block header of the second data block through the first key information;
   generating a signature corresponding to the first key information of the first data block, and adding the signature corresponding to the first key information of the first data block to the block header of the first data block; and
   releasing the block header of the first data block to the service node sub-network, wherein the service node in the service node sub-network is configured to verify the signature comprised in the block header of the first data block, and to obtain the first key information after a successful verification to verify the block header of the second data block.

2. The data management method for a blockchain system according to claim 1, wherein before the adding first key information used for verifying a block header of a second data block generated after the first data block to a block header of the first data block, the data management method further comprises:
   obtaining a certificate corresponding to the second data block from a certificate authority, and using the obtained certificate as the first key information; and/or
   obtaining a public key and a private key corresponding to the second data block from the certificate authority, and using the obtained public key as the first key information.

3. The data management method for a blockchain system according to claim 1, wherein the generating a signature corresponding to the first data block comprises:
   obtaining a signature key corresponding to the first data block; and implementing a signature algorithm on data comprised in the first data block by using the signature key corresponding to the first data block, to generate the signature corresponding to the first data block.

4. The data management method for a blockchain system according to claim 1, wherein after the releasing the block header of the first data block to the service node sub-network, the data management method further comprises:
generating, in a case that the accounting node in the accounting node sub-network generates the second data block, a signature corresponding to the second data block through a signature key corresponding to the first key information and the second data block; and
adding the signature corresponding to the second data block to the block header of the second data block, and releasing the block header of the second data block to the service node sub-network.

5. The data management method for a blockchain system according to claim 1, further comprising:
obtaining, in a case that an obtaining request of a target service node in the service node sub-network for transaction data comprised in a designated data block is received, permission information of the target service node; and
returning, according to the permission information of the target service node, transaction data that the target service node is permitted to obtain and that is comprised in the designated data block to the target service node.

6. An electronic device for implementing a data management method for a blockchain system, the blockchain system comprising an accounting node sub-network and a service node sub-network, the accounting node sub-network comprising an accounting node, and the service node sub-network comprising a service node, the electronic device comprising:
a non-transitory memory having one or more instructions stored thereon; and
at least one hardware-based processor operatively coupled to the non-transitory memory, and configured to execute the one or more instructions to perform a plurality of operations including:
adding, after the accounting node in the accounting node sub-network generates a first data block, first key information used for verifying a block header of a second data block generated after the first data block to a block header of the first data block, wherein:
in a case that the first key information is different from key information used for verifying the block header of the first data block, the first key information is added into a designated field in the block header of the first data block to instruct the service node to verify the block header of the second data block through the first key information, and
in a case that the first key information is the same as the key information used for verifying the block header of the first data block, the designated field is set to null to instruct the service node to verify the block header of the second data block through the first key information;
generating a signature corresponding to the first key information of the first data block, and adding the signature corresponding to the first key information of the first data block to the block header of the first data block; and
releasing the block header of the first data block to the service node sub-network, wherein the service node in the service node sub-network is configured to verify the signature comprised in the block header of the first data block, and to obtain the first key information after a successful verification to verify the block header of the second data block.

7. The electronic device according to claim 6, wherein before the adding first key information used for verifying a block header of a second data block generated after the first data block to a block header of the first data block, the plurality of operations further comprise:
obtaining a certificate corresponding to the second data block from a certificate authority, and using the obtained certificate as the first key information; and/or
obtaining a public key and a private key corresponding to the second data block from the certificate authority, and using the obtained public key as the first key information.

8. The electronic device according to claim 6, wherein the generating a signature corresponding to the first data block comprises:
obtaining a signature key corresponding to the first data block; and
implementing a signature algorithm on data comprised in the first data block by using the signature key corresponding to the first data block, to generate the signature corresponding to the first data block.

9. The electronic device according to claim 6, wherein after the releasing the block header of the first data block to the service node sub-network, the plurality of operations further comprise:
generating, in a case that the accounting node in the accounting node sub-network generates the second data block, a signature corresponding to the second data block through a signature key corresponding to the first key information and the second data block; and
adding the signature corresponding to the second data block to the block header of the second data block, and releasing the block header of the second data block to the service node sub-network.

10. The electronic device according to claim 6, wherein the plurality of operations further comprise:
obtaining, in a case that an obtaining request of a target service node in the service node sub-network for transaction data comprised in a designated data block is received, permission information of the target service node; and
returning, according to the permission information of the target service node, transaction data that the target service node is permitted to obtain and that is comprised in the designated data block to the target service node.

11. A non-transitory computer-readable medium, storing a plurality of computer programs that, when executed by a processor, cause the processor to perform a data management method for a blockchain system, the blockchain system comprising an accounting node sub-network and a service node sub-network, the accounting node sub-network comprising an accounting node, and the service node sub-network comprising a service node, the method including a plurality of operations including:
adding, after the accounting node in the accounting node sub-network generates a first data block, first key information used for verifying a block header of a second data block generated after the first data block to a block header of the first data block, wherein:
in a case that the first key information is different from key information used for verifying the block header of the first data block, the first key information is added into a designated field in the block header of the first data block to instruct the service node to verify the block header of the second data block through the first key information, and in a case that the first key information is the same as the key information used for verifying the block header of the first data block, the designated field is set to null to instruct the service node to verify the block header of the second data block through the first key information;

generating a signature corresponding to the first key information of the first data block, and adding the signature corresponding to the first key information of the first data block to the block header of the first data block; and releasing the block header of the first data block to the service node sub-network, wherein the service node in the service node sub-network is configured to verify the signature comprised in the block header of the first data block, and to obtain the first key information after a successful verification to verify the block header of the second data block.

12. The non-transitory computer-readable medium according to claim 11, wherein before the adding first key information used for verifying a block header of a second data block generated after the first data block to a block header of the first data block, the plurality of operations further comprise:

obtaining a certificate corresponding to the second data block from a certificate authority, and using the obtained certificate as the first key information; and/or obtaining a public key and a private key corresponding to the second data block from the certificate authority, and using the obtained public key as the first key information.

13. The non-transitory computer-readable medium according to claim 11, wherein the generating a signature corresponding to the first data block comprises:

obtaining a signature key corresponding to the first data block; and implementing a signature algorithm on data comprised in the first data block by using the signature key corresponding to the first data block, to generate the signature corresponding to the first data block.

14. The non-transitory computer-readable medium according to claim 11, wherein after the releasing the block header of the first data block to the service node sub-network, the plurality of operations further comprise:

generating, in a case that the accounting node in the accounting node sub-network generates the second data block, a signature corresponding to the second data block through a signature key corresponding to the first key information and the second data block; and adding the signature corresponding to the second data block to the block header of the second data block, and releasing the block header of the second data block to the service node sub-network.

15. The non-transitory computer-readable medium according to claim 11, wherein the plurality of operations further comprise:

obtaining, in a case that an obtaining request of a target service node in the service node sub-network for transaction data comprised in a designated data block is received, permission information of the target service node; and returning, according to the permission information of the target service node, transaction data that the target service node is permitted to obtain and that is comprised in the designated data block to the target service node.

* * * * *